(12) United States Patent
Huang et al.

(10) Patent No.: US 10,151,960 B2
(45) Date of Patent: Dec. 11, 2018

(54) BACKLIGHT ASSEMBLY WITH TUNABLE GRATING LAYER FOR LOCAL DIMMING

(71) Applicant: Microsoft Technology Licensing, LLC, Redmond, WA (US)

(72) Inventors: Jiandong Huang, Bellevue, WA (US); Steven Bathiche, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 14/866,319

(22) Filed: Sep. 25, 2015

(65) Prior Publication Data

US 2017/0090269 A1    Mar. 30, 2017

(51) Int. Cl.
*G02F 1/29*      (2006.01)
*G02F 1/1335*    (2006.01)
(Continued)

(52) U.S. Cl.
CPC ........ *G02F 1/292* (2013.01); *B29D 11/00634* (2013.01); *B32B 17/10321* (2013.01); *G02B 6/005* (2013.01); *G02B 6/0068* (2013.01); *G02F 1/1334* (2013.01); *G02F 1/133615* (2013.01); *G02F 2001/13775* (2013.01);
(Continued)

(58) Field of Classification Search
CPC combination set(s) only.
See application file for complete search history.

(56) References Cited

U.S. PATENT DOCUMENTS

| | | |
|---|---|---|
| 8,172,401 B2 | 5/2012 | Whitehead et al. |
| 8,446,351 B2 | 5/2013 | Whitehead et al. |

(Continued)

FOREIGN PATENT DOCUMENTS

| | | |
|---|---|---|
| EP | 2829908 A1 | 1/2015 |
| JP | 2012141588 A | 7/2012 |

(Continued)

OTHER PUBLICATIONS

"International Search Report and Written Opinion Issued in PCT Application No. PCT/US2016/047113", dated Oct. 18, 2016, 13 Pages.

(Continued)

*Primary Examiner* — Lauren Nguyen
(74) *Attorney, Agent, or Firm* — Fiala & Weaver P.L.L.C.

(57) ABSTRACT

Methods, systems, apparatuses, and computer program products are provided for a backlight assembly for a display device. The backlight assembly includes a transparent waveguide layer, a plurality of light sources, and a tunable grating layer. The light sources are arranged along an edge of the waveguide layer. Each light source transmits light into the waveguide layer through the edge. The grating layer is coupled to the waveguide layer, and has multiple rows. Each row of the grating layer is segmented into a series of cells so the grating layer is sectioned into an array of cells. Each cell is independently controllable to either not extract incident light received from within the waveguide layer, or to extract the incident light for emission from the backlight assembly. In another configuration, the waveguide layer is not present, and the light sources transmit light directly into an edge of the grating layer.

20 Claims, 7 Drawing Sheets

(51) Int. Cl.

| | | |
|---|---|---|
| G02F 1/1334 | (2006.01) | |
| G02F 1/137 | (2006.01) | |
| G02F 7/00 | (2006.01) | |
| F21V 8/00 | (2006.01) | |
| B29D 11/00 | (2006.01) | |
| B32B 17/10 | (2006.01) | |

(52) U.S. Cl.
CPC ............ *G02F 2001/133601* (2013.01); *G02F 2201/30* (2013.01); *G02F 2203/62* (2013.01)

(56) References Cited

U.S. PATENT DOCUMENTS

| | | | |
|---|---|---|---|
| 8,488,090 B2 | 7/2013 | Shestak et al. | |
| 8,564,742 B2 | 10/2013 | Medendorp et al. | |
| 8,773,477 B2 | 7/2014 | Erinjippurath et al. | |
| 8,947,333 B2 | 2/2015 | Huang et al. | |
| 2008/0180583 A1 | 7/2008 | Harada et al. | |
| 2008/0219668 A1 | 9/2008 | Barbarossa | |
| 2009/0167651 A1 | 7/2009 | Minano et al. | |
| 2011/0299008 A1 | 12/2011 | Winkler et al. | |
| 2012/0026423 A1* | 2/2012 | He | G02B 6/0068 349/62 |
| 2013/0170004 A1 | 7/2013 | Futterer | |
| 2014/0098010 A1* | 4/2014 | Travis | G02B 26/005 345/32 |

FOREIGN PATENT DOCUMENTS

| | | | |
|---|---|---|---|
| WO | 2011162024 | A1 | 12/2011 |
| WO | WO-2011-162024 | * | 12/2011 |
| WO | 2012097004 | A1 | 7/2012 |
| WO | 2014108473 | A1 | 7/2014 |

OTHER PUBLICATIONS

Mellette, et al., "Planar waveguide LED illuminator with controlled directionality and divergence", In Proceedings of Optics Express, vol. 22, No. 53, May 5, 2014, 17 pages.

Lin, Frank, "LED Backlight System and Power Solutions", Published on: Mar. 2014, Available at: http://www.richtek.com/assets/AppNote/AN006_EN/AN006_EN.jsp, 7 pages.

Morrison, Geoffrey, "LED local Dimming Explained", Published on: Jan. 22, 2014, Available at: http://www.cnet.com/news/led-local-dimming-explained/, 7 pages.

U.S. Appl. No. 14/329,052, Johnson, et al., "Touch Classification", Filed: Jul. 11, 2014, 41 pages.

U.S. Appl. No. 14/689,360, Huang, et al., "Display Defect Compensation With Localized Backlighting", Filed: Apr. 17, 2015, 41 pages.

"Second Written Opinion Issued in PCT Application No. PCT/US2016/047113", dated Jul. 28, 2017, 6 Pages.

* cited by examiner

BACKLIGHT ASSEMBLY WITH TUNABLE GRATING LAYER FOR LOCAL DIMMING

BACKGROUND

A backlight is a form of illumination used in liquid crystal displays (LCDs). Because an LCD does not produce its own light, another light source, the "backlight," illuminates the LCD so that a visible image is produced. LCDs with backlights are used in many electronic user devices, such as flat panel displays, LCD televisions, mobile devices such as cell phones, etc.

Some LCDs use a backlight that gives off a uniform light over its surface, such as an electroluminescent panel (ELP). Other LCDs use multiple light sources to enable localized dimming, such as light emitting diodes (LEDs), or cold or hot cathode fluorescent lamps (CCFLs or HCFLs). Compared to LCDs with a single uniform backlight, well-designed LCDs with local dimming backlights can exhibit higher energy/power efficiencies, better image qualities, and mura-free (defect free) display qualities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for a backlight assembly for a display device. The backlight assembly includes a transparent waveguide layer, a plurality of light sources, and a tunable grating layer. The light sources are arranged along an edge of the waveguide layer. Each light source transmits light into the waveguide layer through the edge. The grating layer is coupled to the waveguide layer, and has multiple rows. Each row of the grating layer is segmented into a series of cells so the grating layer is sectioned into an array of cells. Each cell is independently controllable to either not pass incident light received from within the waveguide layer, or to pass the incident light for emission from the backlight assembly. In another configuration, the waveguide layer is not present, and the light sources transmit light directly into an edge of the grating layer.

Further features and advantages of various embodiments of the disclosure, as well as the structure and operation of various embodiments of the disclosure, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
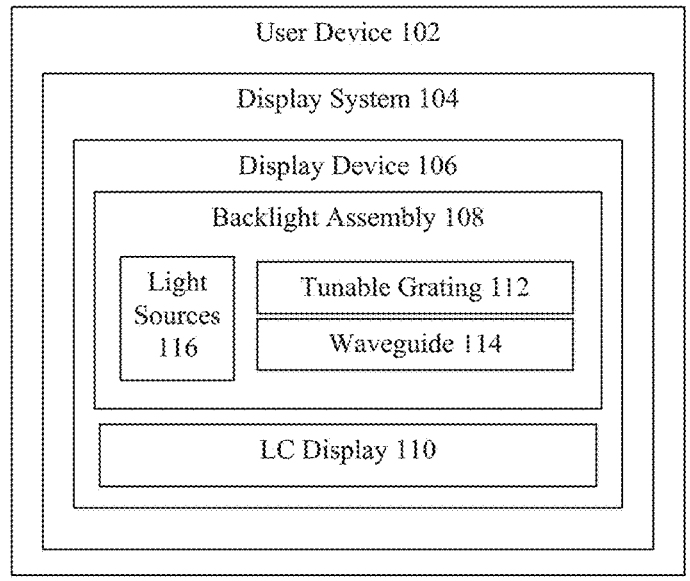
FIG. 1 shows a block diagram of a user device that includes an edge-lit display with a grating layer that enables local backlight dimming, according to an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Furthermore, it should be understood that spatial descriptions ("above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Edge Lit LCD with Local Dimming

A backlight is a form of illumination used in liquid crystal displays (LCDs). Because an LCD does not produce its own light, a "backlight" is used to illuminate the LCD so that a visible image is produced. LCDs with backlights are used in many electronic user devices, such as flat panel displays, LCD televisions, mobile devices such as cell phones, etc.

Some LCDs use a backlight that gives off a uniform light over its surface, while others use multiple light sources to enable localized dimming. LCD performance can be enhanced by increasing the number of dimmable zones in a backlight. Furthermore, LCDs with two dimensions (e.g., an array) of local dimming in a backlight tend to out-perform those with a single dimension (e.g., a row or a column) of local dimming in the backlight, because the two-dimensional matrix has more illumination zones compared to a single row or column.

According to embodiments, a two-dimensional, local dimming backlight is provided that includes edge-arranged light sources (e.g., LEDs). The backlight includes a tunable grating that creates local dimming zones/cells. Such embodiments have various advantages, including one or more of:

The use of fewer light sources, which are expensive. A single row or column of light sources can be used to illuminate the backlight, rather than having a separate light source for each zone or cell of the two-dimensional backlight array;

A liquid crystal (LC) tunable grating having low absorption is used in the backlight to enable improved device power efficiencies. Device power consumption is roughly proportional to the percentage of the display screen showing white content. Accordingly, LCDs with local dimming tend to use less power than LCDs that have a single uniform backlight. This is because, for an LCD with a single backlight, the entire backlight must be on if any portion of the display screen is displaying content. In contrast, for a local-dimming enabled LCD, the backlight may be on only in regions of the display screen that are displaying content, while other regions of the backlight may be off.

A relatively simple optical design is enabled, with greatly enhanced size scalability for the LCD. Traditionally, the scalability of backlight designs are poor, such that when device size changes, a great amount of effort is used to redesign the device and fabrication process;

The switchable LC grating can be configured for surface light extraction cells, in which the diffractions of the LC grating bend light into larger incidental angles than the critical angles for total internal reflection to extract light;

The switchable LC grating can be configured to operate as a waveguide, which enables an increased light/grating interaction volume for more efficient light extraction, potentially enabling fabrication of smaller light extraction zones and enabling higher zone counts for two dimension local dimming backlights;

Broadband grating (achieved by a large refractive index contrast between LCs and polymers) can be used to minimize a wavelength sensitivity of the light extraction grating. According to an alternative technique, a grating with multiple pitches, such as three pitches corresponding to the three prime colors in the backlight spectra, may be produced and used; and Contact lithography can be used for volume production, among other fabrication techniques.

Backlights that incorporate a grating to enable local dimming may be configured in various ways in embodiments. For instance, FIG. 1 shows a block diagram of a user device 102, according to an example embodiment. As shown in FIG. 1, user device 102 includes a display system 104, which includes a display device 106. Display device 106 includes a backlight assembly 108 and a liquid crystal (LC) display 110. Backlight assembly 108 includes a tunable grating 112, a waveguide 114, and a plurality of light sources 116. As described above (and below), waveguide 114 may not be present in some embodiments. User device 102 is described as follows.

User device 102 may be any type of stationary or mobile electronic device that includes a display (touch sensitive or not touch sensitive), including a mobile computer or mobile computing device (e.g., a Microsoft® Surface® device, a personal digital assistant (PDA), a laptop computer, a notebook computer, a tablet computer such as an Apple iPad™, a netbook), a mobile phone (e.g., a cell phone, a smart phone such as a Microsoft Windows® phone, an Apple iPhone, a phone implementing the Google® Android™ operating system, a Palm® device, a Blackberry® device), a wearable computing device (e.g., a smart watch, a head-mounted device including smart glasses such as Google® Glass™), a dashboard, navigation panel, or other display in an automobile, a stationary computing device such as a desktop computer or PC (personal computer), a portable media player, a stationary or handheld gaming console, a personal navigation assistant, a camera, a television, or other type of electronic device.

Display system 104 is configured to enable the display of content by user device 102 on display device 106. In addition to display device 106, display system 104 includes any additional hardware and software and/or firmware used to enable display system 104 to display content. For example, display system 104 may include a graphics subsystem, one or more processors, and/or one or more memories (physical hardware).

Display device 106 is a liquid crystal display (LCD) that displays visible content to users. In particular, backlight assembly 108 generates light (e.g., white light) that passes through, and is filtered by LC display 110 to impart color to the light. The colored light is emitted from display device 106 as content to be viewed by users. Light sources 116 line one or more edges of waveguide 114 (when present) and/or of tunable grating 112. Light from light sources 116 enters into waveguide 114 and/or tunable grating 112. When waveguide 114 is present, the light is reflected internal to waveguide 114 according to the principles of total internal reflection (TIR), being released from waveguide 114 when one or more cells of the array of cells of tunable grating 112 is/are open to let the light pass from waveguide 114, through the open cells of tunable grating 112, to be filtered by LC display 110. When waveguide 114 is not present, the light is reflected internal to tunable grating 112, being released from one or more cells of the array of cells of tunable grating 112 that are opened to be filtered by LC display 110.

Figure 2:
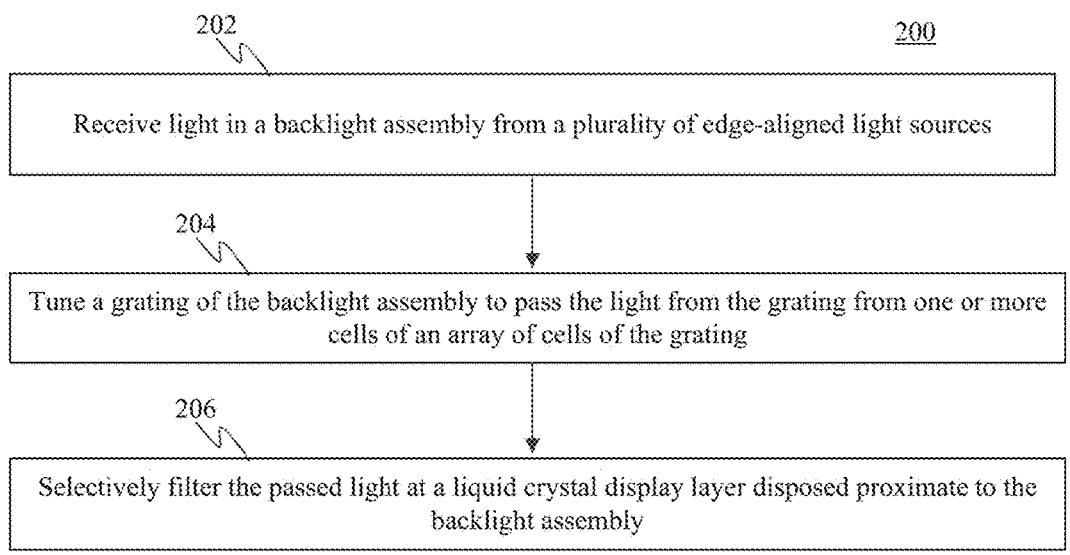
FIG. 2 shows a flowchart providing a process for operating an edge-lit display with a grating layer that enables local backlight dimming, according to an example embodiment.

Display device 106 can operate in various ways, in embodiments. For instance, FIG. 2 shows a flowchart 200 providing a process for operating an edge-lit display with a grating layer that enables local backlight dimming, according to an example embodiment. Display device 106 may operate according to flowchart 200, in embodiments. Further structural and operational embodiments will be apparent to persons skilled in the relevant art(s) based on the following description of flowchart 200.

Flowchart 200 begins with step 202. In step 202, light is received in a backlight assembly from a plurality of edge-aligned light sources. For instance, as described above, light sources 116 line one or more edges of waveguide 114 (when present) and/or tunable grating 112. Light sources 116 may be light emitting diodes (LEDs) or other types of light emitters. Light emitted by light sources 116 enters into waveguide 114 and/or tunable grating 112. When waveguide 114 is present, the light is received at the edge(s) of waveguide 114, entering waveguide 114 and being reflected internally. When waveguide 114 is not present, the light is received at the edge(s) of tunable grating 112, entering tunable grating 112, and being totally reflected internally by the same total internal reflection mechanism as inside waveguides. In an embodiment, a slight tilt angle between the waveguide surfaces (0 degrees means parallel) can be used/optimized for uniformity and efficiencies of light extraction.

In step 204, a grating of the backlight assembly is tuned to pass the light from the grating from one or more cells of an array of cells of the grating. As described above, when waveguide 114 is present, light reflecting internally to waveguide 114 is released from waveguide 114 through one or more cells of the cell arrays of tunable grating 112 that is/are tuned to be opened. When a cell of tunable grating 112 is tuned to be "opened", the cell has grating formed with applied voltages. When a cell of tunable grating 112 is tuned to be "closed," the cell doesn't form grating by switching off the voltages. Light from waveguide 114 passes through all of the open cells to LC display 110. When waveguide 114 is not present, light reflecting internal to tunable grating 112 is released from tunable grating 112 through the cells of the array of cells of tunable grating 112 that are opened. The light escaping through the cell(s) is received by LC display 110.

In step 206, the passed light is filtered at a liquid crystal display layer disposed proximate to the backlight assembly. As described above, the light released from the one or more cells of the array of cells of tunable grating 112 that are opened is received and filtered by LC display 110, passing on into the environment. The filtering imparts color on the received light by removing particular light wavelengths from the incoming light (which may be substantially white or other color(s)), to be perceived by users according to the light wavelengths remaining in the filtered light. Regions of the LC display 110 that receive light from a cell of tunable grating 112 will be illuminated, while regions of the LC display 110 adjacent to closed cells of tunable grating 112 will not be illuminated (e.g., will be dark).

Figure 3:
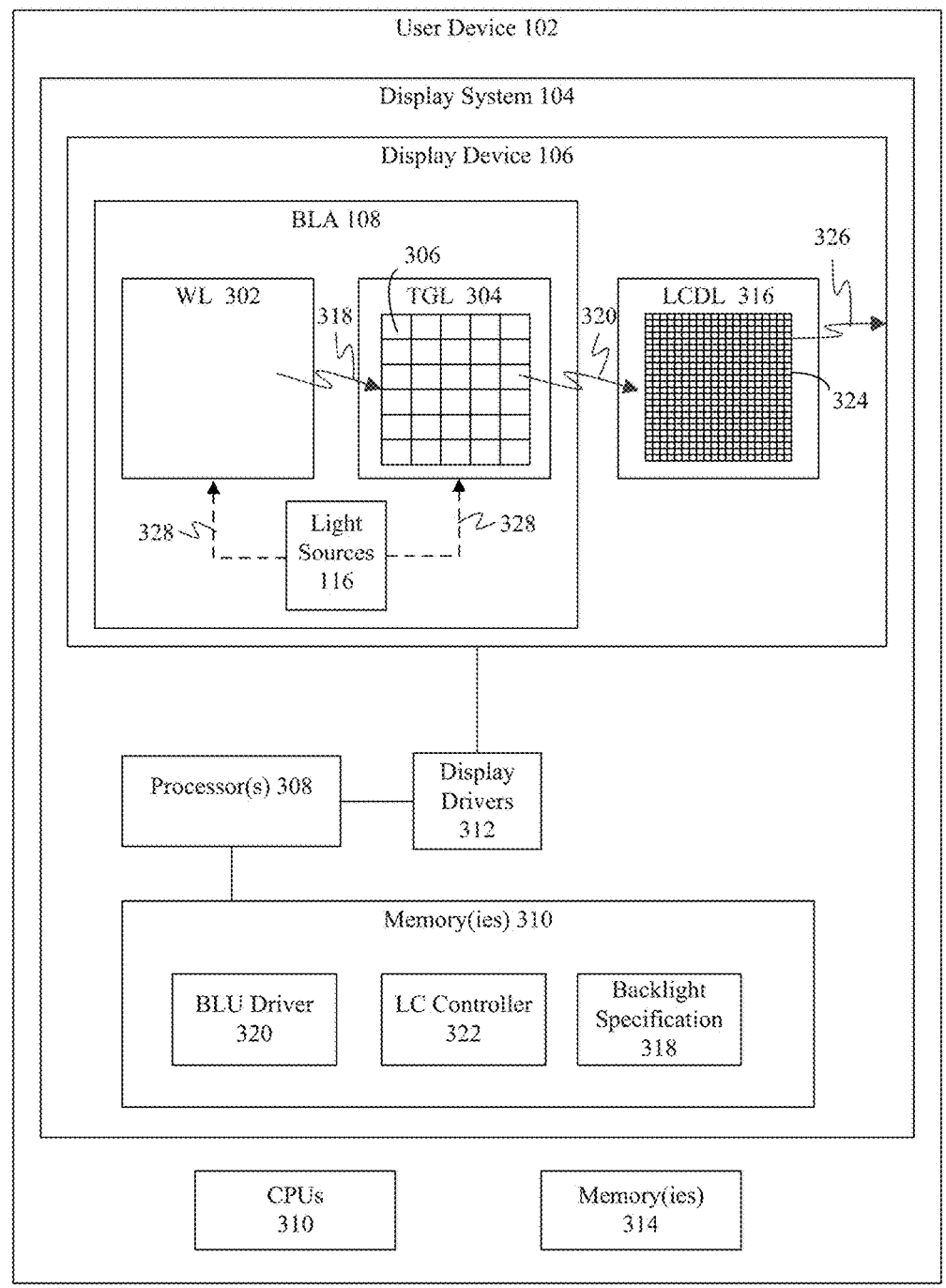
FIG. 3 shows a block diagram of the user device of FIG. 1 including a display system that includes an edge-lit display with a grating layer that enables local backlight dimming, according to an example embodiment.

User device 102, display system 104, and display device 106 may be configured in various ways to perform their functions. For instance, FIG. 3 shows a block diagram of an example of user device 102 of FIG. 1, including example of display system 104 and display device 106, according to an example embodiment. As shown in FIG. 3, user device 102 includes display system 104, one or more central processing units (CPUs) 310, and one or more memories 314. Display system 104 includes display device 106, one or more processor(s) 308, one or more memories 310, and display drivers 312. Display device 106 includes backlight array 108 and a LC display layer 316. Backlight array 108 includes light sources 116, a waveguide layer 302, and a tunable grating layer 304. Tunable grating layer 304 includes an array of cells, including cell 306. LC display layer 316 includes an array 324 of pixels. Memory(ies) 310 store a backlight unit drive 320, a LC controller 322, and a backlight specification 318. Waveguide layer 302 is an example of waveguide 114. Tunable grating layer 304 is an example of tunable grating 112. LC display layer 316 is an example of LC display 110. User device 102 of FIG. 3 is described in further detail as follows.

Display system 104 is communicatively coupled to CPU(s) 310 and/or memories 314 to support the display of video or other images. For example, CPU(s) 310 may provide frame data indicative of each image frame of the video/images to the display system 104. The frame data may be generated by CPU(s) 310 and/or by another component of user device 102. The frame data may be alternatively or additionally obtained by CPU(s) 310 from memories 314 and/or another component of user device 102.

Processor(s) 308 may include a graphics-processing unit (GPU) and/or other processor or processing unit dedicated to graphics- or display-related functionality. Some of the components of the display system 104 may be integrated. For example, processor(s) 308, one or more of memories 310, and/or display drivers 312 may be integrated as a system-on-a-chip (SoC) or application-specific integrated circuit (ASIC). The display system 104 may include additional, fewer, or alternative components. For example, the display system 104 may not include a dedicated processor, and instead rely on CPU(s) 310 that supports the remainder of the electronic user device 102. The display system 104 may not include the memory (or memories) 310, and instead use memories 314 to support display-related processing. In some cases, instructions implemented by, and data generated or used by, processor(s) 308 of the display system 104 may be stored in some combination of memories 314 and memories 310.

As described above, backlight assembly 108 includes a plurality of light sources 116 arranged along one or more edges of waveguide layer 302 and/or grating layer 304. Each light source may be an organic LED (OLED) device, another type of light emitting diode (LED), or another type of light source disposed along a display edge.

Light sources 116 are arranged in a column or row. Each light source 116 is adjacent to a row of cells 306 of grating layer 304, each row including a plurality of cells 306 (or zones, regions, etc.) in series. Each row has at least one light source. In some cases, each row has multiple light sources. The option to include multiple light sources may provide flexibility in configuring the cell arrangement. Having multiple devices per cell may also provide redundancy and/or allow each constituent light source to share the brightness level burden and, thus, be driven at a lower intensity. Operation at lower intensities may help avoid performance decay arising from overdriving the devices. In one example, the light sources are distributed in a column at 30 devices per inch, while backlight assembly 108 has only 10 rows per inch. Other device and cell/row resolutions may be used.

Cells 306 may be arranged in a matrix or array as shown in FIG. 3. In this example, cells 306 are arranged in a number of contiguous rows and columns. The rows and columns may or may not be oriented along the vertical and horizontal axes of the viewable area. In some cases, the size, shape, and other aspects of cells 306 may vary across the viewable area. The number of light sources in each cell may vary from cell to cell.

Processor(s) 308 is coupled to backlight assembly 108 to control the brightness level of light sources 116. In the example of FIG. 3, processor(s) 308 is coupled to backlight assembly 108 via display drivers 312. Processor(s) 308 may execute code of display drivers 312, for example. Alternatively, display drivers 312 may be implemented in the form of hardware (e.g., electrical circuits including one or more processors, logic gates, and/or transistors) that may or may not execute one or both of firmware and software. One or more drivers may be included in display drivers 312.

Processor(s) 308 is configured to control the brightness level for each row of backlight array 108. In the example of FIG. 3, processor(s) 308 is configured in accordance with backlight unit (BLU) driver 320 stored in memories 310. BLU driver 320 is configured to drive a light source for each row separately from other light sources in the other rows. When a row includes multiple light sources, each of the light sources in the respective row may be driven at a common brightness level. Alternatively or additionally, the multiple light sources may be driven at respective, individual brightness levels that together combine to establish a desired collective brightness level for the row.

Backlight assembly 108 may be configured to provide white light. Each light source of light sources 116 may thus be configured to emit white light. In other cases, backlight assembly 108 includes arrangements of three color light sources (e.g., red, green, and blue colors). In such cases, the brightness of each color in a respective row may be controlled separately from the colors in other rows. The respective brightness levels of the colors may be determined as a function of the image to be displayed. In some cases, the brightness of each light source may depend on the intensities of the respective colors present in the image to be displayed. With the capability to address each color plane (or other color emission device) individually, further power savings may be achieved. In addition, with the capability to address three prime color planes individually, the color filters in the LC cells of LC display layer 316 can be removed such that for any instant, the LC display only adjusts the gray scale for the correlated color plane at that instant. This will ideally improve the LCD efficiencies by three times.

LC display layer 316 is disposed adjacent or proximate to backlight assembly 108. One or more intervening layers may be present. In some cases, backlight assembly 108 and LC display layer 316 are in contact with each other. Alternatively, one or more transparent layers are disposed between backlight assembly 108 and LC display layer 316. For example, an adhesive film may be disposed between backlight assembly 108 and LC display layer 316. A diffusing or other layer or element may nonetheless be disposed between backlight assembly 108 and LC display layer 316 in some cases.

LC display layer 316 is configured to selectively filter light generated by the plurality of light sources. LC display layer 316 may be or may include one or more layers arranged in a liquid crystal panel. For example, respective layers may be provided in the liquid crystal panel for separate color filtering. The liquid crystal panel (or layer thereof) 316 defines an array 324 of pixels addressable by processor(s) 308. As shown in FIG. 3, the number of pixels in pixel array 324 may vastly outnumber the resolution of the cell arrangement in backlighting assembly 108. The respective resolutions of pixel array 324 and cell arrangement of grating layer 304 shown in FIG. 3 are merely exemplary and provided for ease in illustration. For example, pixel array 324 may have a resolution one, two, or more orders of magnitude higher than the resolution of the backlight cell arrangement.

Processor(s) 308 individually controls each pixel to determine the extent to which light from the light source(s) passes through LC display layer 316. In this example, processor(s) 308 is configured to control LC display layer 316 in accordance with LC controller 322, which may be executed by processor(s) 308. Processor(s) 308 may be configured to adjust the image tone levels for pixel array 324 of LC display layer 316 to coordinate the filtering of the light with the brightness levels of the light sources. For example, the amount of filtering may be adjusted along a boundary between adjacent cells 306 with different brightness levels. If the pixels on either side of the boundary are intended to have similar image tone levels, the pixels in cell 306 with the brighter backlighting are directed to filter more light relative to the pixels in another cell 306 with a dimmer backlighting. The filtering of a respective pixel of LC display layer 316 may thus be controlled in a manner that takes into account the brightness level of the light source(s) of cell 306 in which the pixel is disposed. The brightness level of backlight assembly 108 and the amount of filtering are thus two controllable variables that combine to achieve a desired tone or brightness for each pixel.

The arrangement of cells 306 may be configurable. In some cases, the configurability of the cell arrangement may be relative to pixel array 324. For example, the cell arrangement may be configurable to dispose a specified number of pixels in each cell 306. The boundaries of cells 306 may thus be configurable. The configurability of the cell arrangement may specify the shape, size, orientation, position, and/or other parameters of cells 306. The total number of cells 306 may also be configurable.

Data indicative of a specification or other definition of the cell arrangement may be stored in memories 310 as backlight specification 318 Processor(s) 308 may then access memories 310 to obtain backlight specification 318 in connection with determining the respective brightness level of each light source. For example, processor(s) 308 may use the data to determine the locations of cells 306, to identify the light source(s) associated with the row of each cell 306, and/or to determine whether any light sources are to be driven at a common level due to, for instance, being disposed in a common row.

Processor(s) 308 processes the frame data to determine the brightness level of the light sources disposed in the backlight cell arrangement. In some cases, the frame data for each cell 306 is processed separately from the frame data for other cells 306. The brightness level may thus be determined for each respective cell, on a row-by-row basis, without having to process the frame data for the entire viewable area of the display system 104. Instead, the brightness level for each row is based on frame data local to the row, rather than global frame data for the entire viewable area.

In some cases, the local frame data is processed by processor(s) 308 to determine a row brightness level that is then subject to further processing before use in driving the backlight unit 120. For example, processor(s) 308 may include a low pass filter (LPF). The low pass filter may be used to smooth the brightness levels of nearby rows. As a result of the smoothing, differences between the brightness levels in adjacent rows may be limited to a predetermined amount. Artifacts or irregularities in the resulting displayed images may thus be avoided or reduced. The low pass filter may be implemented in hardware, software, firmware, or a combination thereof.

In some cases, display defect data is stored in memories 310. The display defect data may be indicative of one or more defects in backlight assembly 108 and/or LC display layer 316, and/or other layer or component of the display system 104. Left uncompensated, the defect(s) may result in a dimmer region of the viewable area. Such defects in LC display layer 316 may be referred to as mura, but other types of defects may be addressed. The defect data may be used by processor(s) 308 to adjust the backlight level for one or more of the rows of grating layer 304 and/or to adjust the control signaling generated for LC display layer 316. The adjustments may be directed to compensating for the distortions arising from the defect(s). The defect data may thus be taken into account when determining the brightness levels of rows. In some cases, the adjusted backlight level(s) may compensate for the defect by increasing the brightness of one or more rows to a level higher than otherwise warranted (e.g., by the frame data to be displayed). Alternatively or additionally, the compensation may involve decreasing the brightness of one or more rows to a level lower than otherwise warranted (e.g., by the frame data to be displayed). In the example of FIG. 3, processor(s) 308 may be configured to compensate for the distortions arising from the display defects in accordance with stored distortion compensation instructions (e.g., in memories 310). Adjustments may therefore be made to compensate for distortions arising from defects in backlight assembly 108 and/or LC display layer 316. The uniformity of the display output may thereby be increased.

For example, the distortion compensation instructions may cause processor(s) 308 to access one or more tables of compensation factors for the backlight brightness levels and/or the LC control signaling. The compensation factors for the backlight brightness levels may be provided on a row-by-row basis.

The compensation factors may be based on one or more measurements directed to detecting the distortions arising from the display defects. Each measurement may involve detecting the output of the display for a given (or known) display image, such as a uniform grey image. The measurement may detect differences in the output intensity across the viewable display area. The measurement data may then be used to generate the compensation factors and thereby calibrate user device 102 to generate a more uniform output.

The backlight compensation factors may be determined in other ways. For instance, the average or minimum BLU intensity within each row may be used to determine the offset from the maximum BLU intensity. Alternatively or additionally, the compensation factor may be determined from the offset in other ways, including, for instance, filtering the offsets to smooth differences between neighboring rows.

Accordingly, processor(s) 308 and display drivers 312 may control each row and cell of BLA 108, controlling one or more light sources for each row to be on or off, and controlling each cell of each row to be on or off (e.g., by applying a voltage to, or removing a voltage from electrodes associated with each cell).

Embodiments are described in further detail as follows. The next subsection describes backlight assemblies with waveguide layers and tunable grating layers, followed by a subsection describing backlight assemblies without waveguide layers, but with tunable grating layers.

A. Example Backlight Assembly Embodiments with Waveguides and Gratings

Figure 4:
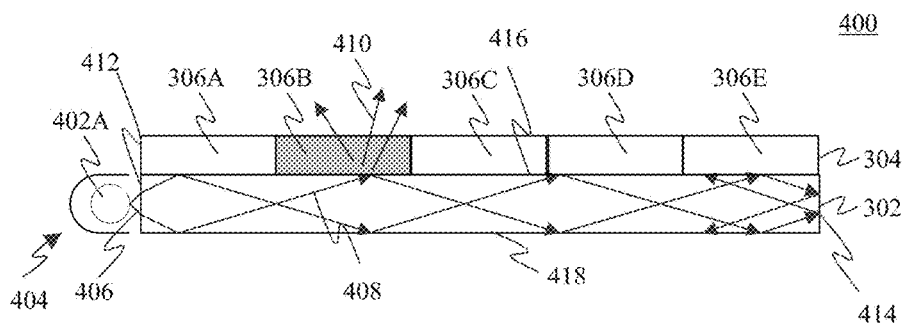
FIG. 4 shows a cross-sectional side view of a backlight assembly that includes a tunable grating layer and a waveguide layer, according to an example embodiment.
Figure 5:
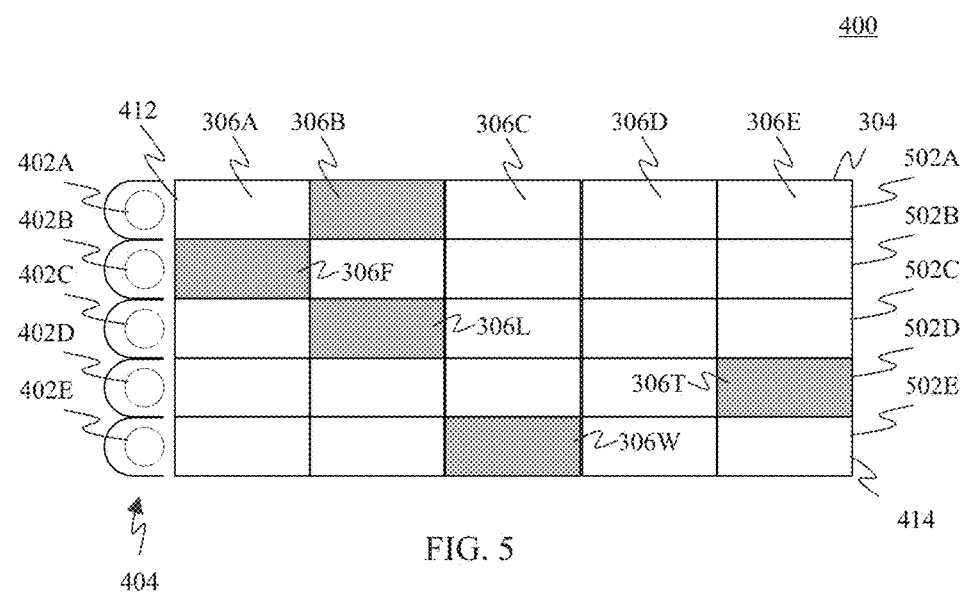
FIG. 5 shows a top view of the backlight assembly of FIG. 4, according to an example embodiment.

Backlight assembly 108 may be configured in various ways to perform its functions, in embodiments. For instance, FIG. 4 shows a cross-sectional side view of a backlight assembly 400 that includes an example of tunable grating layer 304 and an example of waveguide layer 302, according to an embodiment. FIG. 5 shows a top view of backlight assembly 400, according to an example embodiment. Backlight assembly 400 is an example of backlight assembly 108 of FIGS. 1 and 3, and is described as follows.

As shown in FIGS. 4 and 5, backlight assembly 400 includes waveguide layer 302, tunable grating layer 304, and light sources 404. Waveguide layer 302 is transparent, has opposing first and second surfaces 416 and 418, and opposing first and second edges 412 and 414. For surfaces 416 and 418, 412 and 414, there can be small tilt angles (angles other than zero) between them for performances and uniformities. Waveguide layer 302 may be made of any suitable material, including a transparent polymer, glass, a fiber optic material, etc. The light sources 404 are examples of light sources 116 of FIGS. 1 and 3. Light sources 116 includes first-fifth light sources 402A-402E, which are arranged along edge 412 of waveguide layer 412. Although five individual light sources are included in light sources 404 in the example of FIG. 5, any number of light sources may be present, including tens or hundreds of light sources, etc. Each of light sources 402A-402E is configured to transmit light into waveguide layer 302 through edge 412.

Tunable grating layer 304 is coupled to first surface 416 of waveguide layer 302 such that layers 302 and 304 are flat against each other. Layers 302 and 304 may be attached in any manner, including by an adhesive material (e.g., an epoxy, a thin film adhesive), by lamination, by fabricating grating layer 304 on surface 416 of waveguide layer 302, or in another manner. As shown in FIG. 5, tunable grating layer 304 has a plurality of rows 502A-502E, each row segmented into a plurality of cells 306, such that tunable grating layer 304 contains an array of cells 306. For example, row 502A includes cells 306A-306E. Although five individual rows are present, and five individual cells are included in each row in the example of FIG. 5, any number of rows and cells-per-row may be present, including tens or hundreds of rows, tens or hundreds of cells per row, etc. Each cell 306 of tunable grating layer 304 is independently controllable to pass incident light received from within waveguide layer 302 through tunable grating layer 304 to be emitted from backlight assembly 400, or to not pass the incident light.

For example, as shown in FIGS. 4 and 5, cells 306B, 306F, 306L, 306T, and 306W are all turned "on" (as indicated by being shaded), while the rest of the cells of tunable grating layer 304 are turned "off" (as indicated by being white). Accordingly, light reflected inside waveguide layer 304 is released from waveguide layer 304 through cells 306B, 306F, 306L, 306T, and 306W of tunable grating layer 304 to the LC display layer (e.g., LC display layer 316 of FIG. 3), where the light is filtered and emitted from the display screen of the display device. No light from waveguide layer 304 is extracted through the cells that are "off," and thus, the display screen appears dark at the positions of those cells.

With respect to cell 306B, FIG. 4 illustrates how light is passed from backlight assembly 400. Light source 402A emits light 406, which enters waveguide layer 302 at edge 412 as internal light 408. Internal light 408 is reflected off of first and second surfaces 416 and 418 inside waveguide layer 302, including some of internal light 408 reflecting to, and reflecting off of edge 414 back in the opposite direction internal to waveguide layer 302. Because cells 306A, 306C, 306D, and 306E are "off" (no grating formed), internal light 408 cannot escape from waveguide layer 302 at those locations. However, cell 306B is on (grating formed), and therefore internal light 408 passes into tunable grating layer 304 at the location of cell 306B as extracted light 410. Extracted light 410 passes through tunable grating layer 304 to be received by the LC display layer (not shown in FIG. 4).

Tunable grating layer 304 can be constructed in various ways to be tunable, where individual cells can be opened or closed to extraction of light. For example, tunable grating layer 304 may include a liquid crystal material to which an electric field may be applied to transition tunable grating layer 304 from being formed to being disappeared.

Figure 6:
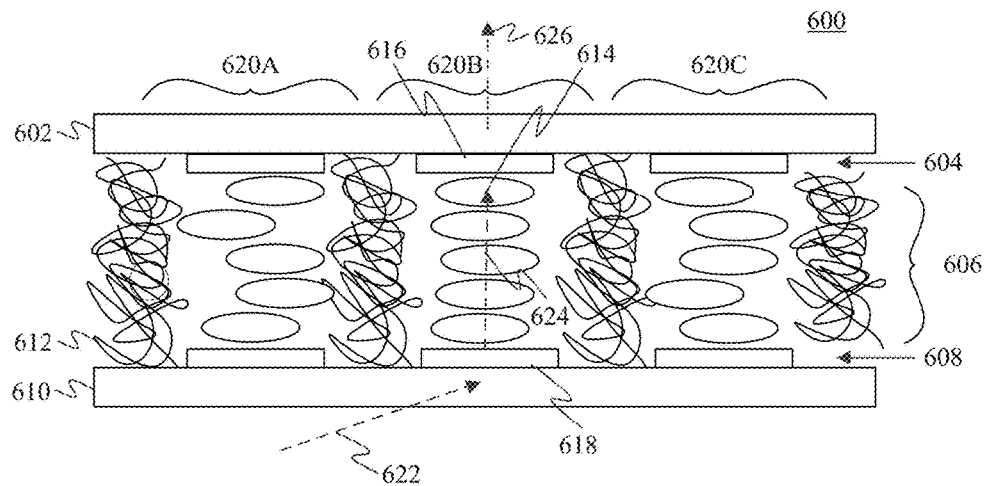
FIG. 6 shows a cross-sectional side view of a tunable grating layer, according to an example embodiment.

For instance, FIG. 6 shows a cross-sectional side view of a tunable grating layer 600, according to an example embodiment. As shown in FIG. 6, tunable grating layer 600 includes a first cover layer 602, a first electrode layer 604, a segmented liquid crystal (LC) layer 606, a second electrode layer 608, and a second cover layer 610. Tunable grating layer 600 is tunable, and is described as follows.

First and second cover layers 602 and 610 are solid planar transparent layers configured to enclose or be attached by other layers between them or on them. First and second cover layers 602 and 610 may be made from any suitable materials, such as glass, a plastic, etc. In an embodiment, first and second cover layers 602 and 610 are transparent electrodes that provide voltages to switch on and off the grating. In another embodiment, first and second cover layers 602 and 610 may each have a reflective polarizing film applied to its external surface, with the polarization direction of these two films being parallel. In this embodiment, when the LC cells of LC layer 606 include a material having the property of birefringence (a refractive index that depends on the polarization and propagation direction of light), the extracted light from the backlight waveguide will possess certain polarization. When the backlight extraction polarizations are aligned with the input polarization of LC display layer 316, the overall LCD efficiencies are doubled ideally.

First and second electrode layers 604 and 608 are shown on the inner surfaces of first and second cover layers 602 and 610, respectively. First and second electrode layers 604 and 608 each include an array of electrodes made out of a transparent electrically conductive material, such as ITO (indium tin oxide) or other such material. For example, first and second electrode layers 604 and 608 may each include an electrode for each cell of tunable grating layer 600. For illustrative purposes, three cells 620A-620C in a selected row are shown in FIG. 6. First electrode layer 604 includes electrodes of a first polarity (e.g., positive) and second electrode layer 608 includes electrodes of a second polarity (e.g., negative). First electrode 616 in first electrode layer 604 and second electrode 618 in second electrode layer 608 are indicated for cell 620B in FIG. 6. The electrodes may be rectangular (including square), round, or other shape.

Segmented LC layer 606 is located between first and second cover layers 602 and 610. Segmented LC layer 606 includes a polymer matrix 612 and a liquid crystal material 614. Polymer matrix 612 is a polymer material formed in the shape of a grid (crisscrossing rows and columns of polymer material), and liquid crystal material 614 fills the spaces of the grid. Each LC material 614-filled space in the grid corresponds to a cell of tunable grating layer 600. For instance, as shown in FIG. 6, each of cells 620A-620C corresponds to a space in the grid that is filled with LC material 614.

Accordingly, each cell of tunable grating layer 600 may be individually turned on to extract light, or turned off to allow passage of light along the waveguide. For example, operation of cell 620B is described with respect to an embodiment. Incident light 622 is received at second cover 610 from the waveguide layer. If no voltage is applied across electrodes 616 and 618, no electric field is induced in cell 620B, and thus the orientation of the liquid-crystal molecules of LC material 614 is determined by the alignment at the surfaces of electrodes 618 and 620. Normally, LC material 614 is selected and designed in such a way that the refractive index will match those of the surrounding polymers. Thus, light will go through the LC cells, hit the top surfaces and be reflected back in the waveguide by total internal reflection.

If a voltage is applied across electrodes 618 and 620 that is sufficiently large, the liquid crystal molecules of LC material 614 in the center of cell 620B are almost completely untwisted, leading to local optical index change Δn to form the grating. Light 624 is then extracted outside the waveguide 600. By controlling the voltage applied across the liquid crystal layer in each pixel, light can be allowed to be extracted in varying amounts thus constituting different levels of gray.

Polymer matrix 612 of segmented LC layer 606 may be formed as any suitable type of grating, known or proprietary. For instance, in an embodiment, polymer matrix 612 may be formed as a Raman-Nath grating that diffracts light according to Raman-Nath diffraction, where a highest DE (diffraction efficiency) for $1^{st}$ order is 34%. In another embodiment, polymer matrix 612 may be formed as a Bragg grating that diffracts light according to Bragg diffraction, where the highest DE for $1^{st}$ order is 100%. As such, a Bragg grating may be formed as a grating with smaller period (smaller cells) relative to a Raman-Nath grating. Equations 1 and 2 shown below indicate criteria for an un-slanted Bragg grating:

$$\frac{\lambda^2}{n_0 n_1 \Lambda^2} \geq 5 \qquad \text{Equation 1}$$

$$n(x) = n_0 + n_1 \sin\left(\frac{2\pi}{\Lambda}x\right) \qquad \text{Equation 2}$$

where:

$\Lambda$=period of the grating of the tunable grating layer;

$\lambda$=wavelength of incident light beam;

n(x)=the index at position (x) of the grating;

$n_0$=the average optical index of the material of the tunable grating layer; and $n_1$=max(n(x))−$n_0$=$n_0$−min(n(x), if the index changes follow sin(x) relations.

Persons skilled in the relevant art(s) will understand techniques for Raman-Nath diffraction and Bragg diffraction.

Figure 7:
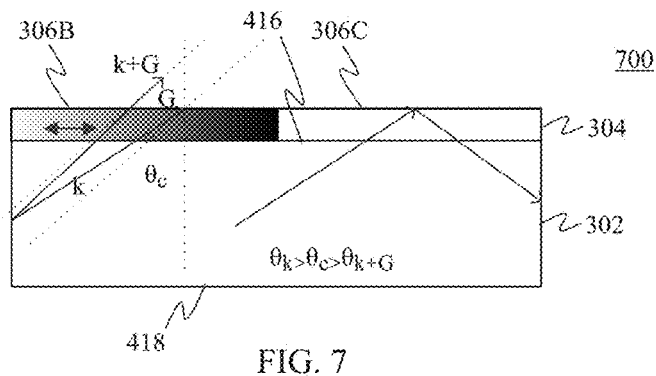
FIG. 7 shows a cross-sectional side view of a backlight assembly, illustrating controllable light extraction from a grating layer, according to an example embodiment.

Accordingly, tunable grating layer 600 may be configured to selectively extract or not extract light through each cell. As described above, tunable grating layer 600 extract (or does not extract) the light received from the waveguide layer. FIG. 7 shows a cross-sectional side view of a backlight assembly 700, illustrating controllable light extraction from a grating layer, according to an example embodiment. Backlight assembly 700 is an example of backlight assembly 108. As shown in FIG. 7, backlight assembly 700 includes waveguide layer 302 and grating layer 304. Furthermore, FIG. 7 shows angles of light travel internal and external to backlight assembly 700 and tunable grating layer 304, illustrating controllable extraction of light from waveguide layer 302 by tunable grating layer 304.

Total internal reflection (TIR) is a phenomenon that occurs when a propagating wave strikes a medium boundary (optical interface) at an angle larger than a particular critical angle with respect to the normal of the surface. If the refractive index is lower on the other side of the boundary and the incident angle is greater than the critical angle, the wave cannot pass through and is entirely reflected. The critical angle is the angle of incidence above which the total internal reflection occurs. Light can be described by a vector, k with a value of $2\pi$/wavelength and direction as the propagation direction. For periodic grating, we can define grating vector G with a value of $2\pi$/(grating period) and direction as the direction of the 'fastest' index change, i.e., the shortest grating period. When a photon (with vector k) is coupled with the grating, the direction will be diverted to (vector operation) (k+G) or (k−G), and this will bend the light into incidental angles less than the critical angles, making them propagate into the low index media (for example, air with the index 1).

Accordingly, several angles are illustrated in FIG. 7:

$\theta_c$=critical angles for total internal reflection (TIR);

$\theta_k$=incidental angle for light; and $\theta_{k+G}$=diffract angle for light on grating.

With respect to FIG. 7, θc is the critical angle for total internal reflection of light in waveguide layer 302.

Figure 8:
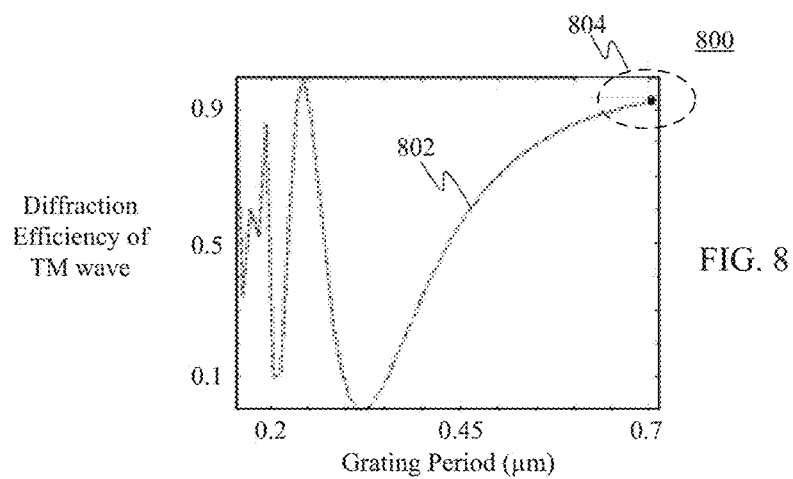
FIG. 8 shows a graph including a plot of diffraction efficiency versus grating period for light with fixed wavelength, according to an example embodiment.

The pitch of polymer matrix 612 may be selected for improved performance. For instance, FIG. 8 shows a graph 800 including a plot 802 of diffraction efficiency (Y-axis) versus grating period (X-axis), according to an example embodiment. As shown in FIG. 8, grating periods of 0.25 and 0.7 μm have high diffraction efficiencies. However, the grating period of 0.25 μm has a much lower tolerance to variations in the grating period, while the grating period of 0.7 μm has a much higher tolerance to grating period variations. Thus, a grating period of 0.7 μm may be desired for high fabrication tolerances in some embodiments.

Figure 9:
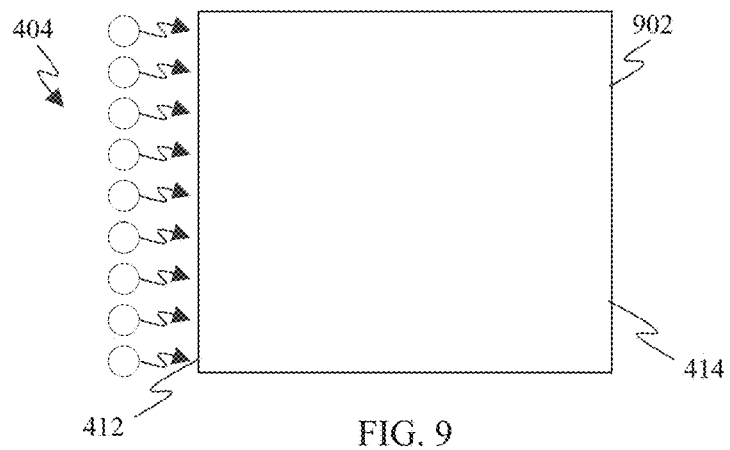
FIG. 9 shows a top view of a single-piece waveguide layer, according to an example embodiment.
Figure 10:
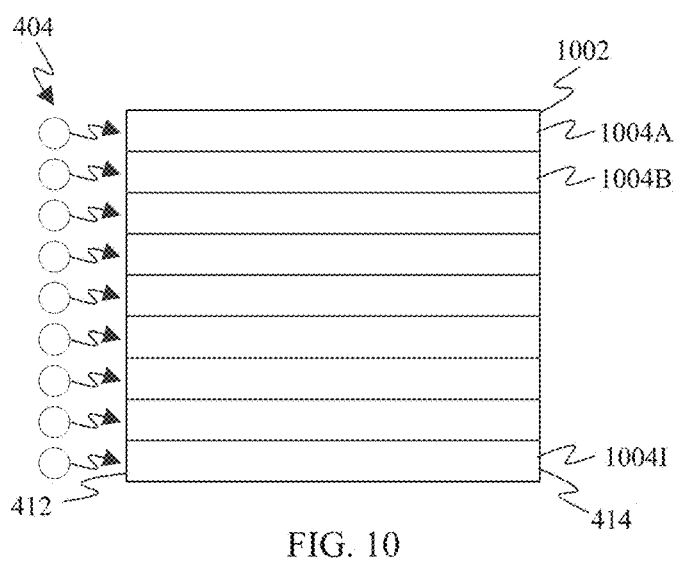
FIG. 10 shows a top view of a waveguide layer segmented into rows, according to an example embodiment.
Figure 11:
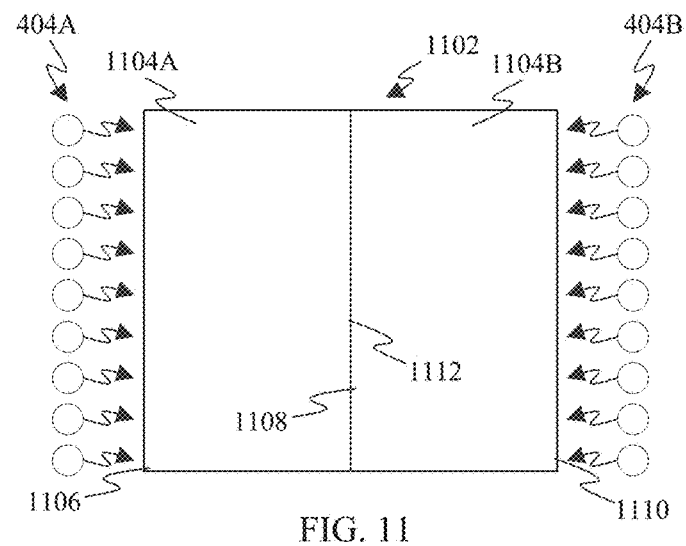
FIG. 11 shows a top view of a two-piece waveguide layer, according to an example embodiment.

In FIGS. 3, 4, and 7, the waveguide layers are shown as solid, continuous single pieces. For example, FIG. 9 shows a top view of a single-piece waveguide layer 902 that may be used as waveguide layer 302, according to an example embodiment. In alternative embodiments, a waveguide layer may be formed of multiple pieces that are joined together. For example, FIG. 10 shows a top view of a waveguide layer 1002 segmented into a plurality of rows 1004A-1004I, according to an example embodiment. Nine waveguide rows are shown in FIG. 10 for purposes of illustration, but in other embodiments, other numbers of rows may be present in waveguide 1002, including tens or hundreds of rows, etc. In another example, FIG. 11 shows a top view of a two-piece waveguide layer 1102, according to an example embodiment. As shown in FIG. 11, waveguide layer 1102 is comprised of first and second waveguide components 1104A and 1104B, which are connected together at ends 1108 and 1112, respectively.

Rows 1002A-1002I or waveguide components 1104A and 1104B may be formed separately (or cut from a sheet) and attached together in planar arrangements using an adhesive (e.g., an epoxy, a thin film adhesive) to form waveguide layer 1002 or waveguide layer 1102, respectively. The medium boundaries formed by the joining of rows/components create reflective surfaces for internally propagating light waves. Accordingly, with regard to waveguide layer 1002, light is retained within each of rows 1002A-1002I, not crossing from one row to another (e.g., reflecting from sides and/or at ends 412 and 414 of each row). With regard to waveguide layer 1102, light is retained within each of components 1104A and 1104B, not crossing from one component to the other. As shown in FIG. 11, waveguide component 1104A has first and second ends 1106 and 1108 from which light may internally reflect, and waveguide component 1104B has first and second ends 1110 and 1112 from which light may internally reflect.

In an alternative embodiment, the medium boundaries between rows 1002A-1002I, and between waveguide components 1104A and 1104B may be created in a single-piece (or other) waveguide layer, such as waveguide layer 902 without physically separating the rows/components. For example, a laser may be used to melt the waveguide material at the boundaries, a saw may be used to cut most of the way through the waveguide material, and the cut may be filled with a material (e.g., a polymer, an epoxy), or the medium boundaries may be formed in another manner.

As shown in FIG. 11, a first plurality of light sources 404A is arranged along edge 1106 of waveguide component 1104A, and a second plurality of light sources 404B is arranged along edge 1110 of waveguide component 1104B. In this manner, each waveguide component 1104A and 1104B has its own source of light for internal reflection, and for being extracted by the tunable grating layer. It is noted that a single plurality of light sources 404 is shown in each of FIGS. 9 and 10 for waveguide layers 902 and 1002. In a similar fashion, first and second plurality of light sources 404A and 404B may be present at ends 412 and 414 of each of waveguide layers 902 and 1002 to insert light at both of ends 412 and 414. With respect to waveguide layer 1102, an advantage of light sources at both ends is power efficiency, where the light in each component travels a shorter distance. With respect to waveguide layers 902 and 1002, an advantage of light sources at both ends is increased symmetry, which may offset an impact from absorption losses.

Still further, in an embodiment, features of waveguide layers 1002 and 1102 of FIGS. 10 and 11 may be combined. For example, one or both of waveguide components 1104A and 1104B in waveguide layer 1102 may be segmented into rows 1002A-1002I, each row having a respective one or more light sources.

B. Example Backlight Assembly Embodiments with Gratings (without Waveguide Layers)

Figure 12:
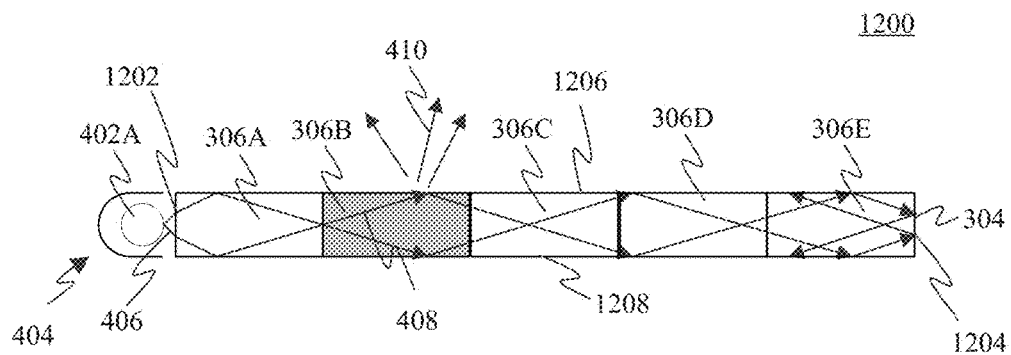
FIG. 12 shows a cross-sectional side view of a backlight assembly that includes a tunable grating layer that directly receives light from a light source, according to an example embodiment.

In further embodiments, backlight assembly 108 may be assembled without a waveguide layer. For instance, FIG. 12 shows a cross-sectional side view of a backlight assembly 1200 that includes tunable grating layer 304, according to an example embodiment. Backlight assembly 1200 does not include a waveguide layer. Tunable grating layer 304 directly receives light from light sources 404. The top view of backlight assembly 1200 appears similar to the top view of backlight assembly 1200 shown in FIG. 5. Accordingly, FIG. 5 may be referred to in this subsection for description of backlight assembly 1200.

Tunable grating layer 304 has opposing first and second ends 1202 and 1204, and opposing first and second surfaces 1206 and 1208. Tunable grating layer 304 may be fabricated in any suitable manner, and include any suitable materials, such as described above with respect to FIG. 6 and/or elsewhere herein.

Light sources 404 is an example of light sources 116 of FIGS. 1 and 3. Light sources 116 may include any number of light sources (e.g., first-fifth light sources 402A-402E shown in FIG. 5), which are arranged along edge 412 of waveguide layer 412. Each light source is configured to transmit light into tunable grating layer 304 through edge 412. Note that in an embodiment, similar to FIG. 11, a second plurality of light sources may be arranged along edge 1204, to transmit light into tunable grating layer 304 through edge 1204.

As shown in the example of FIG. 5, tunable grating layer 304 has a plurality of rows 502A-502E, each row segmented into a plurality of cells 306, such that tunable grating layer 304 contains an array of cells 306. For example, row 502A includes cells 306A-306E. Although five individual rows are present, and five individual cells are included in each row in the example of FIG. 5, any number of rows and cells-per-row may be present. Each cell 306 of tunable grating layer 304 is independently controllable to pass incident light to be emitted from backlight assembly 1200, or to not pass the incident light.

For example, as shown in FIGS. 4 and 5, cells 306B, 306F, 306L, 306T, and 306W are all turned "on" (as indicated by being shaded), while the rest of the cells of tunable grating layer 304 are turned "off" (as indicated by being white). Accordingly, light reflected inside tunable grating layer 304 is released from tunable grating layer 304 from cells 306B, 306F, 306L, 306T, and 306W to the LC display layer (e.g., LC display layer 316 of FIG. 3), where the light is filtered and emitted from the display screen of the display device. No light within tunable grating layer 304 is released from the cells that are "off," and thus, the display screen appears dark at the positions of those cells.

With respect to cell 306B, FIG. 12 illustrates how light is passed from backlight assembly 1200. Light source 402A emits light 406, which enters tunable grating layer 304 at edge 1202 as internal light 408. Internal light 408 is reflected from first and second surfaces 1206 and 1208 inside tunable grating layer 304, including some of internal light 408 reflecting to, and reflecting off of, edge 1204 back in the opposite direction internal to tunable grating layer 304. Because cells 306A, 306C, 306D, and 306E are "off" (no light extraction), internal light 408 cannot escape from tunable grating layer 304 at those locations. However, cell 306B is on (light extraction), and therefore internal light 408 is released from tunable grating layer 304 at the location of cell 306B as passed light 410.

As described above, backlight assembly 400 (FIG. 4) operates according to surface light extraction. Backlight assembly 1200 operates according to volume light extraction, where light reflecting internal to tunable grating layer 304 is selectively released from cells. Due to the presence of waveguide layer 302, the surface light extraction configuration of backlight assembly 400 is not as easily made into a thin form factor. The volume light extraction configuration of backlight assembly 1200 can achieve a thin form factor, as well as efficient light extraction.

Figure 13:
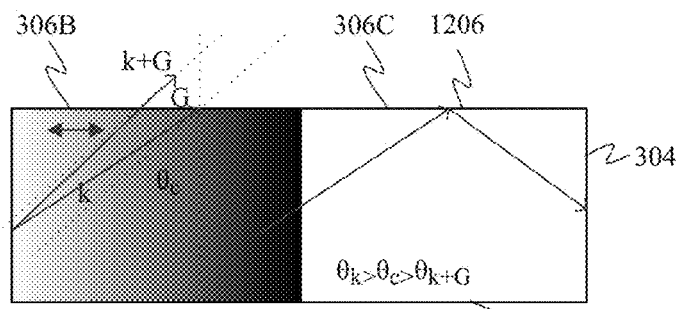
FIG. 13 shows a cross-sectional side view of a grating layer, illustrating internal light reflection, according to an example embodiment.

FIG. 13 shows a cross-sectional side view of grating layer 304, according to an example embodiment. FIG. 13 shows angles of light travel internal and external to tunable grating layer 304, illustrating controllable extraction of light from tunable grating layer 304. The angles illustrated in FIG. 7 are also shown in FIG. 13, including $\theta_c$ (critical angles for TIR), $\theta_k$ (incidental angle for any light), and $\theta_{k+G}$ (diffracted angle for light from grating). Accordingly, with respect to FIG. 13, $\theta c$ is the critical angle for total internal reflection of light in tunable grating layer 304. Light striking surfaces 1206 and 1208 internal to tunable grating layer will reflect back within waveguide layer 302 if the light hits a surface at an angle larger than $\theta_c$.

Grating layers have strong wavelength dependencies. A backlight is desired to be configured with a broad spectrum to cover broad color gamuts (subsets of colors in a color space). Accordingly, in an embodiment, the wavelength dependences of tunable grating layer 304 may be eased through the use of multiple pitches in the polymer matrix layer (e.g., polymer matrix 612), with each pitch corresponding to a desired color wavelength for extraction. For example, it may be desired to create tunable grating layer 304 to have three pitches coinciding with the primal wavelengths of red, green, and blue to efficiently extract these three colors.

Figure 14:
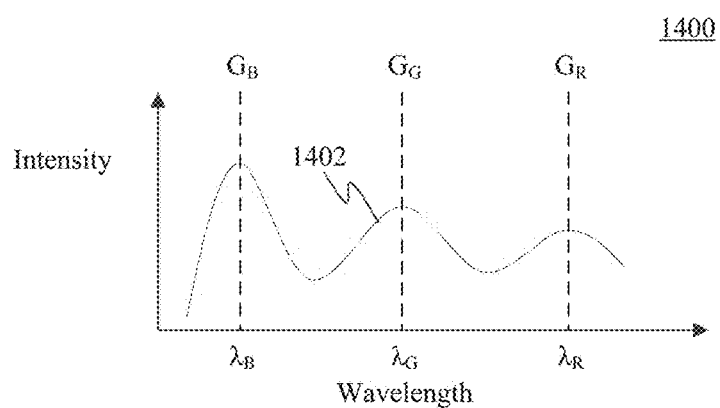
FIG. 14 shows a graph including a plot of light wavelength versus intensity, according to an example embodiment.

Two light wave sources are perfectly coherent if they produce light having a constant phase difference and the same frequency. "Coherent length" of light is a propagation distance over which a coherent light wave maintains a specified "degree of coherence" (normalized correlation of electric fields). Normally, coherent light sources are not needed for the above-mentioned embodiments. However, as shown in FIG. 14, due to the selection of three prime colors for efficient light extraction by the grating, light sources with short coherent lengths can be used to optimize the light extraction efficiencies, thus enable thinner and smaller light extraction cells for higher resolution local dimming backlight designs. Light sources with very long coherent lengths may be less suitable due to speckle effects, in some implementations.

FIG. 14 shows a graph 1400 including a plot 1402 of light wavelength (X-axis) versus intensity (Y-axis), according to an example embodiment. Three wavelengths values corresponding to the light colors of blue, green, and red are indicated on the X-axis. As shown in FIG. 14, a pitch may be provided in a tunable grating layer to enhance passage of each of these three light wavelengths (indicated by three intensity peaks on plot 1402).

Figure 15:
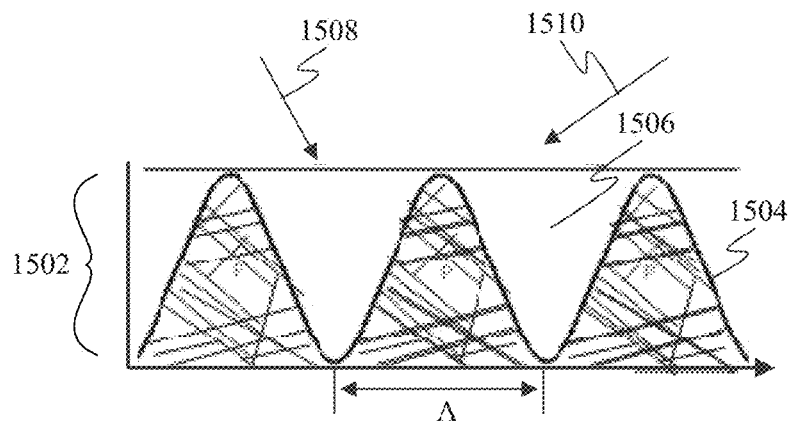
FIG. 15 shows a side cross-sectional view of a grating layer formed with multiple pitches to form the grating to pass selected light wavelengths, according to an example embodiment.

One or more pitches may be formed in the LC polymer matrix of the tunable grating layer in various ways. For instance, FIG. 15 shows a side cross-sectional view of a tunable grating layer 1502 formed with two writing beams (1508 and 1510) with fixed angles. Tunable grating layer 1502 is an example of tunable grating layer 304 described above. As shown in FIG. 15, tunable grating layer 1502 includes a polymer matrix 1504 (similar to polymer matrix 612) and a liquid crystal material 1506 (similar to liquid crystal material 614) filling the space formed by polymer 1504 inside tunable grating layer 1502.

Accordingly to FIG. 15, two or more writing beams, such as writing beams 1508 and 1510, may be applied to tunable grating layer 1502 to form one or more pitches in polymer matrix 1504. For example, each writing configuration beam may be calibrated to form a corresponding pitch. When a writing beam (e.g., high photon energy) is absorbed by the polymer matrix 1504, a chemical reaction occurs and polymer matrix 1504 is created.

Figure 16:
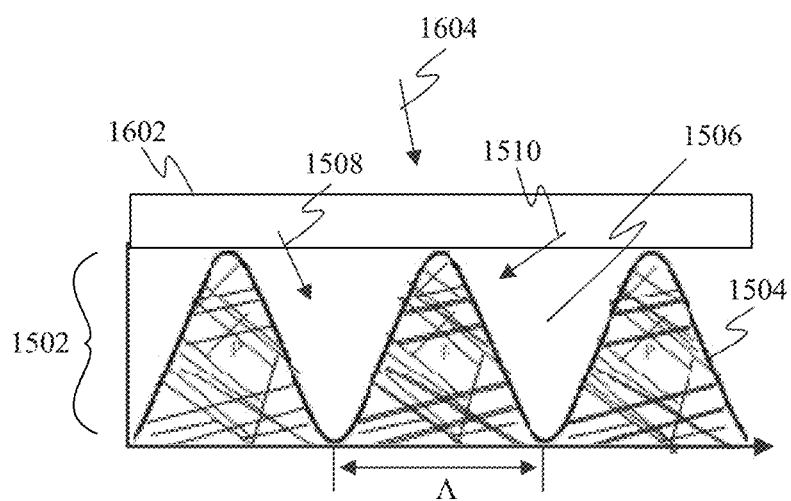
FIG. 16 shows a side cross-sectional view of a grating layer and an overlaid mask used to form multiple pitches in the grating layer, according to an example embodiment.

FIG. 15 illustrates multiple separate writing beams 1508 and 1510 being simultaneously applied. According to another embodiment, FIG. 16 shows a side cross-sectional view of tunable grating layer 1502 with an overlaid mask 1602 on a top surface. Mask 1602 enables multiple pitches to be formed in tunable grating layer through the application of a single writing beam 1604. Writing beam 1604, having a pre-determined intensity and wavelength(s), is directed onto mask 1602. Mask 1602 filters writing beam 1604 to generate multiple writing beams 1508 and 1510 (and optionally further writing beams), each having a corresponding intensity and wavelength(s) configured to generate multiple pitches in polymer matrix 1504 of tunable grating layer 1502.

III. Example Mobile and Stationary Device Embodiments

Backlight unit drive 320, LC controller 322, and display drivers 312 may be implemented in hardware, or hardware combined with software and/or firmware. For example, backlight unit drive 320, LC controller 322, and display drivers 312 may be implemented as computer program code/instructions configured to be executed in one or more processors and stored in a computer readable storage medium. Alternatively, backlight unit drive 320, LC controller 322, and display drivers 312 may be implemented as hardware logic/electrical circuitry, including being implemented together in a SoC (system on chip). The SoC may include an integrated circuit chip that includes one or more of a processor (e.g., a central processing unit (CPU), microcontroller, microprocessor, digital signal processor (DSP)), memory, one or more communication interfaces, and/or further circuits, and may optionally execute received program code and/or include embedded firmware to perform functions.

As used herein, the terms "computer program medium," "computer-readable medium," and "computer-readable storage medium" are used to refer to physical hardware media such as the hard disk associated with hard disk drive 1314, removable magnetic disk 1318, removable optical disk 1322, other physical hardware media such as RAMs, ROMs, flash memory cards, digital video disks, zip disks, MEMs, nanotechnology-based storage devices, and further types of physical/tangible hardware storage media (including memories 310 and/or 314 of FIG. 3). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

IV. Example Embodiments

In one embodiment, a backlight assembly for a display device comprises: a transparent waveguide layer having a first surface; a plurality of light sources arranged along an edge of the transparent waveguide layer, each light source configured to transmit light into the waveguide layer through the edge; and a tunable grating layer coupled to the first surface of the waveguide layer having a plurality of rows, each row of the grating layer segmented into a plurality of cells, such that the tunable grating layer contains an array of cells, each cell being independently controllable to extract incident light received from within the waveguide layer through the tunable grating layer to be emitted from the backlight assembly or to not extract the incident light.

In an embodiment, the tunable grating layer is a liquid crystal grating layer.

In an embodiment, the liquid crystal grating layer comprises: a transparent first cover layer; a transparent second cover layer; a polymer layer between the first and second cover layers segmented into rows and columns that define the array of cells; and a liquid crystal material contained in the cells; each cell having a corresponding electrode pair configured to receive a voltage to cause the liquid crystal of the cell to change index to enable the cell to extract light from the waveguide.

In an embodiment, the tunable grating layer is configured with a plurality of pitches.

In an embodiment, the plurality of pitches includes a first pitch configured to extract red light wavelengths, a second pitch configured to extract blue light wavelengths, and a third pitch configured to extract green light wavelengths.

In an embodiment, the waveguide layer is segmented into a plurality of rows.

In an embodiment, the backlight assembly further comprises a second plurality of light sources arranged along a second edge of the transparent waveguide layer, each light source of the second plurality configured to transmit light into the second edge of the waveguide layer.

In an embodiment, the waveguide layer comprises: a first waveguide component having opposing first and second edges; and a second waveguide component that is coplanar with the first waveguide component and having opposing first and second edges, the second edges of the first and second waveguide components coupled together; the first edge of the first waveguide component having the first plurality of light sources arranged alongside to receive the light transmitted by the first plurality of light sources; and the first edge of the second waveguide component having the second plurality of light sources arranged alongside to receive the light transmitted by the second plurality of light sources.

In another embodiment, a backlight assembly for a display device comprises: a tunable grating layer having a plurality of rows; and a plurality of light sources arranged along an edge of the tunable grating layer, each light source configured to transmit light into the tunable grating layer through the edge; each row of the grating layer is segmented into a plurality of cells such that the tunable grating layer contains an array of cells, each cell being independently controllable to extract incident light from within the tunable grating layer to be emitted from the backlight assembly or to not extract the incident light.

In an embodiment, the tunable grating layer is a liquid crystal grating layer.

In an embodiment, the liquid crystal grating layer comprises: a transparent first cover layer; a transparent second cover layer; a polymer layer between the first and second cover layers segmented into rows and columns that define the array of cells; and a liquid crystal material contained in the cells; each cell having a corresponding electrode pair configured to receive a voltage to cause the liquid crystal of the cell to change optical index to allow light extracted from waveguide.

In an embodiment, the tunable grating layer is configured with a plurality of pitches that includes a first pitch configured to extract red light wavelengths, a second pitch configured to extract blue light wavelengths, and a third pitch configured to extract green light wavelengths.

In an embodiment, the light sources are configured to generate coherent light with short coherent lengths.

In another embodiment, a display device comprises: a backlight assembly that includes a transparent waveguide layer having a first surface, a plurality of light sources arranged along an edge of the transparent waveguide layer, each light source configured to transmit light into the waveguide layer through the edge, and a tunable grating layer coupled to the first surface of the waveguide layer having a plurality of rows, each row of the grating layer segmented into a plurality of cells, such that the tunable grating layer contains an array of cells, each cell being independently controllable to extract incident light from within the waveguide layer through the tunable grating layer to be emitted from the backlight assembly or to not extract the incident light; and a liquid crystal display layer disposed proximate to the backlight assembly, the liquid crystal layer configured to selectively filter the light emitted from the backlight assembly.

In an embodiment, the grating layer comprises: a transparent first cover layer; a transparent second cover layer; a polymer layer between the first and second cover layers segmented into rows and columns that define the array of cells; and a liquid crystal material contained in the cells; each cell having a corresponding electrode pair configured to receive a voltage to cause the liquid crystal of the cell to change optical index to enable the cell to extract light from the first waveguide.

In an embodiment, the first and second cover layers have first and second reflective polarizing films respectively applied thereto, the first and second reflective polarizing films having parallel polarization directions; the liquid crystal material is a birefringent material; and the parallel polarization directions of the first and second reflective polarizing films are aligned with an input polarization of the liquid crystal display layer.

In an embodiment, the tunable grating layer is configured with a plurality of pitches that include a first pitch configured to extract red light wavelengths, a second pitch configured to extract blue light wavelengths, and a third pitch configured to extract green light wavelengths.

In an embodiment, the waveguide layer is segmented into a plurality of rows.

In an embodiment, the backlight assembly further comprises: a second plurality of light sources arranged along a second edge of the transparent waveguide layer, each light source of the second plurality configured to transmit light into the second edge of the waveguide layer.

In an embodiment, the waveguide layer comprises: a first waveguide component having opposing first and second edges; and a second waveguide component that is coplanar with the first waveguide component and having opposing first and second edges, the second edges of the first and second waveguide components coupled together; the first edge of the first waveguide component having the first plurality of light sources arranged alongside to receive the light transmitted by the first plurality of light sources; and the first edge of the second waveguide component having the second plurality of light sources arranged alongside to receive the light transmitted by the second plurality of light sources.

V. Conclusion

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A backlight assembly for a display device, comprising:
   a transparent waveguide layer having a first surface;
   a plurality of light sources arranged along an edge of the transparent waveguide layer, each light source configured to transmit light into the waveguide layer through the edge; and
   a tunable grating layer coupled to the first surface of the waveguide layer having a plurality of rows, each row of the tunable grating layer segmented into a plurality of cells, such that the tunable grating layer contains an array of cells, each cell including a corresponding electrode pair, each cell independently controllable by control of a voltage applied to the corresponding electrode pair to extract incident light received from within the waveguide layer through the tunable grating layer to be emitted from the backlight assembly or to not extract the incident light, the tunable grating layer configured with a plurality of pitches corresponding to a plurality of colors, each pitch configured to extract a wavelength of the corresponding color.

2. The backlight assembly of claim 1, wherein the tunable grating layer is a liquid crystal grating layer.

3. The backlight assembly of claim 2, wherein the liquid crystal grating layer comprises:
   a transparent first cover layer;
   a transparent second cover layer;
   a polymer layer between the first and second cover layers segmented into rows and columns that define the array of cells; and
   a liquid crystal material contained in the cells;
   each cell having a corresponding electrode pair configured to receive a voltage to cause the liquid crystal of the cell to change index to enable the cell to extract light from the waveguide.

4. The backlight assembly of claim 1, wherein the tunable grating layer is configured with a plurality of pitches.

5. The backlight assembly of claim 4, wherein the plurality of pitches includes a first pitch configured to extract red light wavelengths, a second pitch configured to extract blue light wavelengths, and a third pitch configured to extract green light wavelengths.

6. The backlight assembly of claim 1, wherein the waveguide layer is segmented into a plurality of rows.

7. The backlight assembly of claim 1, further comprising a second plurality of light sources arranged along a second edge of the transparent waveguide layer, each light source of the second plurality configured to transmit light into the second edge of the waveguide layer.

8. The backlight assembly of claim 7, wherein the waveguide layer comprises:
   a first waveguide component having opposing first and second edges; and
   a second waveguide component that is coplanar with the first waveguide component and having opposing first and second edges, the second edges of the first and second waveguide components coupled together;
   the first edge of the first waveguide component having the first plurality of light sources arranged alongside to receive the light transmitted by the first plurality of light sources; and
   the first edge of the second waveguide component having the second plurality of light sources arranged alongside to receive the light transmitted by the second plurality of light sources.

9. A display device, comprising:
   a backlight assembly that includes
   a transparent waveguide layer having a first surface,
   a plurality of light sources arranged along an edge of the transparent waveguide layer, each light source configured to transmit light into the waveguide layer through the edge, and
   a tunable grating layer coupled to the first surface of the waveguide layer, the tunable grating layer having a plurality of rows, each row of the tunable grating layer segmented into a plurality of cells, such that the tunable grating layer contains an array of cells, each cell including a corresponding electrode pair, each cell independently controllable by control of a voltage applied to the corresponding electrode pair to extract incident light from within the waveguide layer through the tunable grating layer to be emitted from the backlight assembly or to not extract the incident light, the tunable grating layer configured with a plurality of pitches corresponding to a plurality of colors, each pitch configured to extract a wavelength of the corresponding color; and
   a liquid crystal display layer disposed proximate to the backlight assembly, the liquid crystal layer configured to selectively filter the light emitted from the backlight assembly.

10. The display device of claim 9, wherein the tunable grating layer comprises:
   a transparent first cover layer;
   a transparent second cover layer;
   a polymer layer between the first and second cover layers segmented into rows and columns that define the array of cells; and
   a liquid crystal material contained in the cells;
   each cell having a corresponding electrode pair configured to receive a voltage to cause the liquid crystal of the cell to change optical index to enable the cell to extract light from the first waveguide.

11. The display device of claim 10, wherein the first and second cover layers have first and second reflective polarizing films respectively applied thereto, the first and second reflective polarizing films having parallel polarization directions;
   the liquid crystal material is a birefringent material; and
   the parallel polarization directions of the first and second reflective polarizing films are aligned with an input polarization of the liquid crystal display layer.

12. The display device of claim 9, wherein the tunable grating layer is configured with a plurality of pitches that include a first pitch configured to extract red light wavelengths, a second pitch configured to extract blue light wavelengths, and a third pitch configured to extract green light wavelengths.

13. The display device of claim 9, wherein the waveguide layer is segmented into a plurality of rows.

14. The display device of claim 9, wherein the backlight assembly further comprises:
   a second plurality of light sources arranged along a second edge of the transparent waveguide layer, each light source of the second plurality configured to transmit light into the second edge of the waveguide layer.

15. The display device of claim 14, wherein the waveguide layer comprises:
   a first waveguide component having opposing first and second edges; and
   a second waveguide component that is coplanar with the first waveguide component and having opposing first and second edges, the second edges of the first and second waveguide components coupled together;
   the first edge of the first waveguide component having the first plurality of light sources arranged alongside to receive the light transmitted by the first plurality of light sources; and
   the first edge of the second waveguide component having the second plurality of light sources arranged alongside to receive the light transmitted by the second plurality of light sources.

16. A display device, comprising:
   a transparent waveguide layer having a first surface;
   a plurality of light sources arranged along an edge of the transparent waveguide layer, each light source configured to transmit light into the waveguide layer through the edge; and
   a tunable grating layer coupled to the first surface of the waveguide layer and containing an array of cells, each cell of the array of cells including a corresponding electrode pair and independently controllable by control of a voltage applied to the corresponding electrode pair to extract incident light received from within the waveguide layer through the tunable grating layer to be emitted from the tunable grating layer or to not extract the incident light, the tunable grating layer configured with a plurality of pitches corresponding to a plurality of colors, each pitch configured to extract a wavelength of the corresponding color.

17. The display device of claim 16, wherein the tunable grating layer is a liquid crystal grating layer.

18. The display device of claim 17, wherein the liquid crystal grating layer comprises:
   a transparent first cover layer;
   a transparent second cover layer;
   a polymer layer between the first and second cover layers segmented into rows and columns that define the array of cells; and a liquid crystal material contained in the cells;

each cell having a corresponding electrode pair configured to receive a voltage to cause the liquid crystal of the cell to change index to enable the cell to extract light from the waveguide.

19. The display device of claim 16, wherein the waveguide layer comprises:

a first waveguide component having opposing first and second edges; and a second waveguide component that is coplanar with the first waveguide component and having opposing first and second edges, the second edges of the first and second waveguide components coupled together;

the first edge of the first waveguide component having the first plurality of light sources arranged alongside to receive the light transmitted by the first plurality of light sources; and the first edge of the second waveguide component having the second plurality of light sources arranged alongside to receive the light transmitted by the second plurality of light sources.

20. The display device of claim 16, wherein the tunable grating layer is configured with a plurality of pitches.

* * * * *